United States Patent
Ichimura

(10) Patent No.: US 7,286,602 B2
(45) Date of Patent: Oct. 23, 2007

(54) METHOD OF DATA TRANSMISSION FOR N-CHANNEL DIGITAL DATA IN AN M-CHANNEL BLOCK FORMAT

(75) Inventor: Gen Ichimura, Tokyo (JP)

(73) Assignee: Sony Corporation (JP)

( * ) Notice: Subject to any disclaimer, the term of this patent is extended or adjusted under 35 U.S.C. 154(b) by 801 days.

(21) Appl. No.: 10/311,774

(22) PCT Filed: Apr. 24, 2002

(86) PCT No.: PCT/JP02/04099

§ 371 (c)(1),
(2), (4) Date: May 8, 2003

(87) PCT Pub. No.: WO02/089412

PCT Pub. Date: Nov. 7, 2002

(65) Prior Publication Data

US 2003/0169782 A1    Sep. 11, 2003

(30) Foreign Application Priority Data

Apr. 27, 2001    (JP) .............................. 2001-132213

(51) Int. Cl.
H04K 1/10 (2006.01)
H04L 27/28 (2006.01)
(52) U.S. Cl. ...................................................... 375/260
(58) Field of Classification Search ................ 375/260;
455/450, 509; 370/264, 302, 329, 335, 336,
370/341, 342, 348, 431, 464, 395, 487, 537,
370/538, 459
See application file for complete search history.

(56) References Cited

U.S. PATENT DOCUMENTS 6,904,403 B1 *    6/2005    Muraki et al. .............. 704/212

2001/0006553 A1    7/2001    Osakabe et al.

FOREIGN PATENT DOCUMENTS

EP    1 093 122 A2    4/2001
JP    3-113926 A    5/1991

(Continued)

OTHER PUBLICATIONS

International Search Report completed on Jul. 25, 2002.

(Continued)

*Primary Examiner*—David C. Payne
*Assistant Examiner*—Aslan Ettehadieh
(74) *Attorney, Agent, or Firm*—Lerner, David, Littenberg, Krumholz & Mentlik, LLP

(57) ABSTRACT

An audio data transmitting device with a varying channel count which on the transmission side includes, data of n channels divided into blocks each defined for m channels where $n \leq m$. In addition, prior to a transmission of the audio data, a transmitted-data stream matching a predetermined transmission format is generated to include determination information used for determining which portions of each block is allocated to which portions of each block containing no valid data. On the reception side, the determination information included in the received transmitted-data stream matching the predetermined transmission format is used to identify the unused channels not assigned to valid data in each of the blocks composing the transmitted-data stream which allows data of the valid channels to be extracted from the stream.

5 Claims, 10 Drawing Sheets

FOREIGN PATENT DOCUMENTS

| | | |
|---|---|---|
| JP | 8-079216 A | 3/1996 |
| JP | 2000-115103 A | 4/2000 |
| JP | 2001-028612 | 1/2001 |
| WO | WO-00/72547 | 11/2000 |

OTHER PUBLICATIONS

China Office Action (English Translation).

"TA Document 1999014 Enhancement to Audio and Music Data Transmission Protocol 1.0" Device Bay Specification. 1394 Trade Association Document, Jul. 10, 2000, pp. 1-53.

* cited by examiner

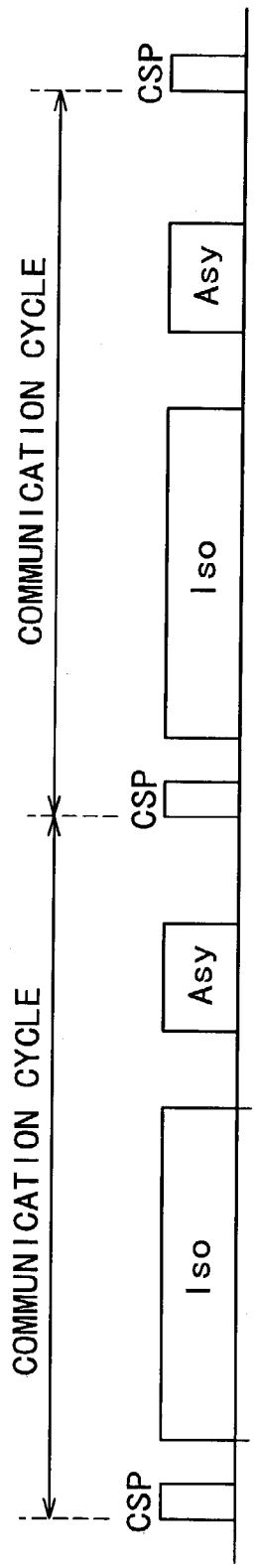
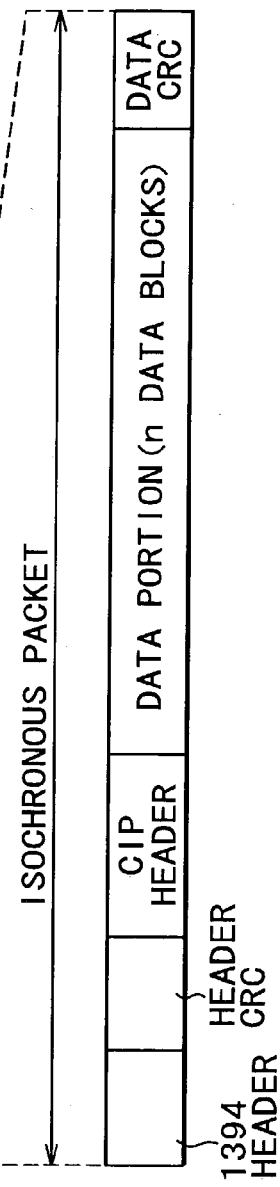
F I G. 1 A
F I G. 1 B

F I G. 3

| VALUE | DESCRIPTION |
|---|---|
| 00h–3Fh | IEC60958 CONFORMANT |
| 40h–4Fh | MULTI-BIT LINEAR AUDIO |
| 50h–57h | ONE BIT AUDIO (PLAIN) |
| 58h–5Fh | ONE BIT AUDIO (ENCODED) |
| 60h–7Fh | –RESERVED– |
| 80h–83h | MIDI CONFORMANT |
| 84h–87h | EXTENDED MUSIC DATA |
| 88h–8Bh | SMPTE TIME CODE CONFORMANT |
| 8Ch–8Fh | SAMPLE COUNT |
| 90h–BFh | –RESERVED– |
| C0h–EFh | ANCILLARY DATA |
| F0h–FFh | –RESERVED– |

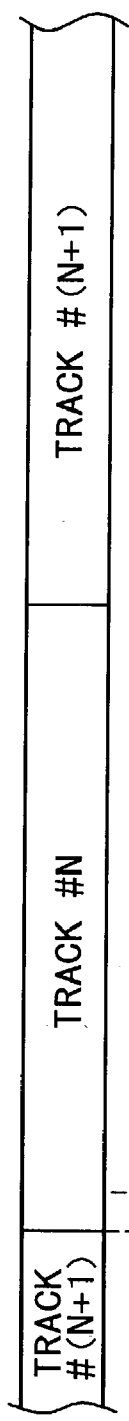
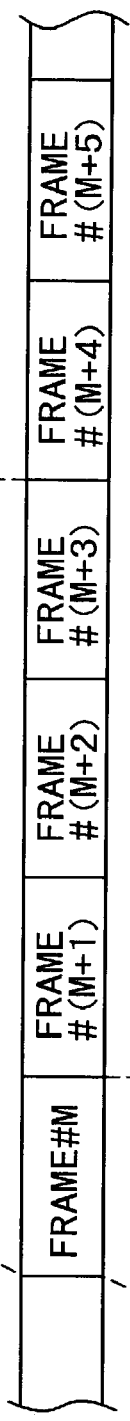
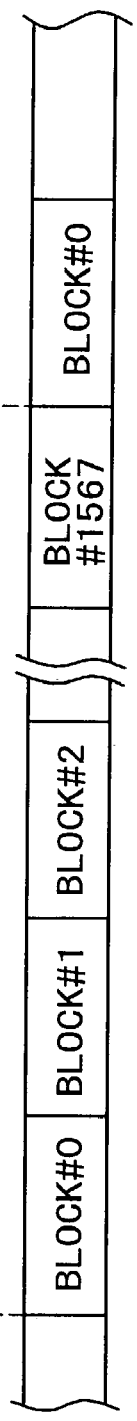
FIG. 5A
FIG. 5B
FIG. 5C

F I G. 7A
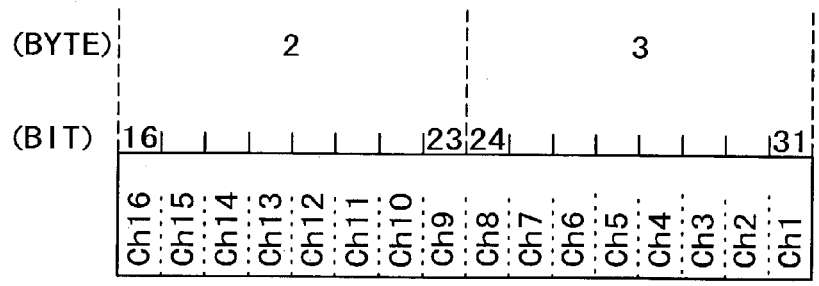
F I G. 7B
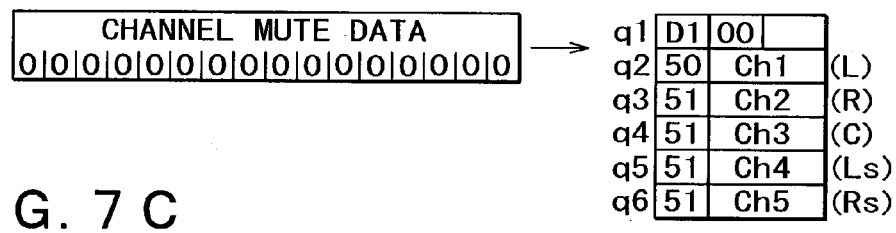
F I G. 7C
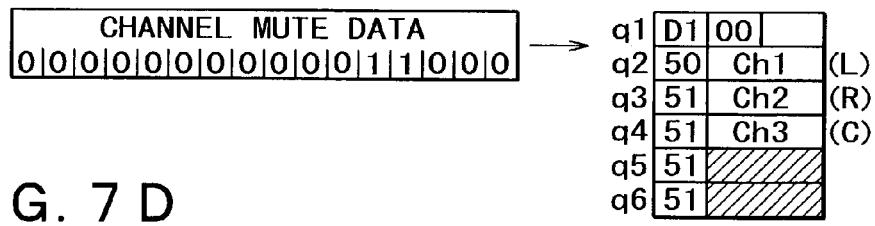
F I G. 7D
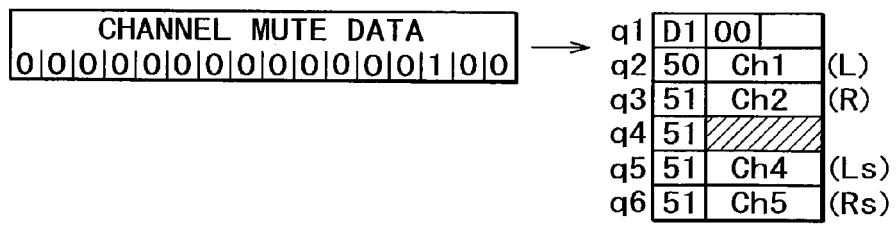

FIG.10A
PRIOR ART

| q1 | D1 | 00 |      |
|----|----|----|------|
| q2 | 50 | Ch1 | (L) |
| q3 | 51 | Ch2 | (R) |
| q4 | CF | CF |      |

FIG.10B
PRIOR ART

| q1 | D1 | 00 |      |
|----|----|----|------|
| q2 | 50 | Ch1 | (L) |
| q3 | 51 | Ch2 | (R) |
| q4 | 51 | Ch3 | (C) |
| q5 | 51 | Ch4 | (Ls) |
| q6 | 51 | Ch5 | (Rs) |

FIG.10C
PRIOR ART

| q1 | D1 | 00 |      |
|----|----|----|------|
| q2 | 50 | Ch1 | (L) |
| q3 | 51 | Ch2 | (R) |
| q4 | 51 | Ch3 | (C) |
| q5 | 51 | Ch4 | (LFE) |
| q6 | 51 | Ch5 | (Ls) |
| q7 | 51 | Ch6 | (Rs) |
| q8 | CF | CF |      |

METHOD OF DATA TRANSMISSION FOR N-CHANNEL DIGITAL DATA IN AN M-CHANNEL BLOCK FORMAT

TECHNICAL FIELD

The present invention relates to a transmission system for transmitting digital data in a predetermined transmission format by division of the data into blocks, and relates to a data transmission apparatus, a data reception apparatus, a data transmission method and a data reception method, which are employed and adopted in the transmission of the data.

BACKGROUND ART

Speaking about audio data, for example, data of 2 channels, namely, L and R channels, is predominant. In recent years, however, audio data of 3, 4 or more channels has been used widely.

In order to keep up with the popularization of such multi-channel audio data, the transmission format of the audio data is adapted to a variety of channel counts.

A detailed structure of transmitted data will be described later. Briefly speaking, however, in transmission of audio data by adoption of an SACD (Super Audio CD) technique conforming to IEEE-1394 specifications, for example, a transmitted-data stream is formed to include a sequence of units known as blocks each containing audio data. To be more specific, each block contains audio data of all channels.

FIGS. 10A to 10C are each a diagram showing the structure of a block. In the case of 2-channel audio data, a block consists of 4 quadlets q1 to q4 each having a size of 32 bits as shown in FIG. 10A. The second quadlet q2 is allocated to data of the L channel, which is used as the first channel or channel 1. On the other hand, the third quadlet q3 is allocated to data of the R channel, which is used as the second channel or channel 2.

It is to be noted that 'D1', '00', '50', '51' and 'CF' shown in FIGS. 10A to 10C are each information called a label or a sub-label, which will be explained later in a description of an embodiment.

In the case of 5-channel audio data, a block consists of 6 quadlets q1 to q6 as shown in FIG. 10B. The second to sixth quadlets q2 to q6 are allocated to the first to fifth channels or channels 1 to 5 respectively. The first channel or channel 1 is the L channel, the second channel or channel 2 is the R channel, the third channel or channel 3 is the C (center) channel, the fourth channel or channel 4 is the Ls (rear left) channel and the fifth channel or channel 5 is the Rs (rear right) channel.

In the case of 6-channel audio data, a block consists of 8 quadlets q1 to q8 as shown in FIG. 10C. The second to seventh quadlets q2 to q7 are allocated to the first to sixth channels or channels 1 to 6 respectively. The first channel or channel 1 is the L channel, the second channel or channel 2 is the R channel, the third channel or channel 3 is the C (center) channel, the fourth channel or channel 4 is the LFE (Low Frequency Enhancement) channel, the fifth channel or channel 5 is the Ls (rear left) channel and the sixth channel or channel 6 is the Rs (rear right) channel.

A transmission block is defined for 2, 5 or 6 channels for example as described above so as to allow 2-channel, 5-channel or 6-channel audio data respectively to be transmitted.

In consequence, however, definition of transmission block for a specific channel count necessitates that the structure of a block be newly defined for transmission of audio data having a different channel count so to speak.

For example, a block needs to be newly defined for transmission of audio data having a channel count of 3, 4 or 7.

It is to be noted that the definition of a new block itself is possible from the technical point of view. In the definition of a new block, the number of quadlets composing a block needs to be merely determined properly and the quadlets need to be merely allocated to channel data appropriately.

However, data with a new block structure is transmitted with a newly prescribed transmission format, which is unknown to the reception apparatus previously developed and already shipped to the field in general.

Thus, there is raised a problem that the audio data cannot be received and processed correctly.

DISCLOSURE OF INVENTION

It is thus an object of the present invention addressing the problem described above to provide a capability of transmitting multi-channel digital data through a transmission line in a predetermined transmission format by division of the data into blocks without prescribing a new block format for each channel count.

In order to achieve the object described above, the present invention provides a data transmission apparatus, which is used for transmitting digital data in a predetermined transmission format by division of the data into blocks and includes transmitted-data generation means for apportioning data of n channels to portions of each of the blocks each capable of accommodating data of m channels where $n \leq m$, generating a transmitted-data stream matching the transmission format and providing the transmitted-data stream with determination information included therein for determining whether or not any of the portions pertaining to each of the blocks is allocated to a channel not assigned to valid data, and transmission means for transmitting the transmitted-data stream generated by the transmitted-data generation means.

A data reception apparatus provided by the present invention includes reception means for receiving a transmitted-data stream which includes blocks of digital data and is transmitted in a predetermined transmission format and received-data-processing means for determining whether or not any of the portions pertaining to each of the blocks composing the transmitted-data stream received by the reception means is allocated to a channel not assigned to valid data on the basis of determination information included in the transmitted-data stream and extracting only data of channels each assigned to valid data from the transmitted-data stream.

In addition, the present invention also provides a transmission system including the data transmission apparatus and the data reception apparatus, which have the configurations described above.

A data transmission method provided by the present invention includes the steps of apportioning data of n channels to portions of each of blocks each capable of accommodating data of m channels where $n \leq m$, generating a transmitted-data stream matching a transmission format, providing the transmitted-data stream with determination information included therein for determining whether or not any of the portions pertaining to each of the blocks is allocated to a channel not assigned to valid data and transmitting the transmitted-data stream.

A data reception method provided by the present invention includes the steps of receiving a transmitted-data stream transmitted in a predetermined transmission format including blocks of digital data, determining whether or not any of the portions pertaining to each of the blocks composing the received transmitted-data stream is allocated to a channel not assigned to valid data on the basis of determination information included in the received predetermined transmitted-data stream and obtaining only data of channels each assigned to valid data from the received transmitted-data stream.

That is to say, in accordance with the present invention, data of n channels is apportioned to portions of each block capable of accommodating data of m channels where $n \leq m$. Thus, the data of n channels can be transmitted without setting a block format specially for n channels.

In this case, a block defined for m channels may include a channel not assigned to valid data. For this reason, determination information is used on the reception side to determine whether or not each of the blocks composing the received transmitted-data stream includes a portion allocated to a channel not assigned to valid data. Thus, the data of n channels can be received correctly on the reception side.

BRIEF DESCRIPTION OF THE DRAWINGS

FIGS. 1A and 1B are explanatory diagrams showing a transmission format conforming to IEEE-1394 specifications;

FIG. 3 is an explanatory diagram showing label values of a data block;

FIGS. 5A to 5C are explanatory diagrams showing a block sequence of the embodiment;

FIGS. 7A to 7D are explanatory diagrams showing channel mute data in the embodiment;

FIGS. 10A to 10C are explanatory diagrams showing structures of transmitted blocks.

BEST MODE FOR CARRYING OUT THE INVENTION

Figure 2:
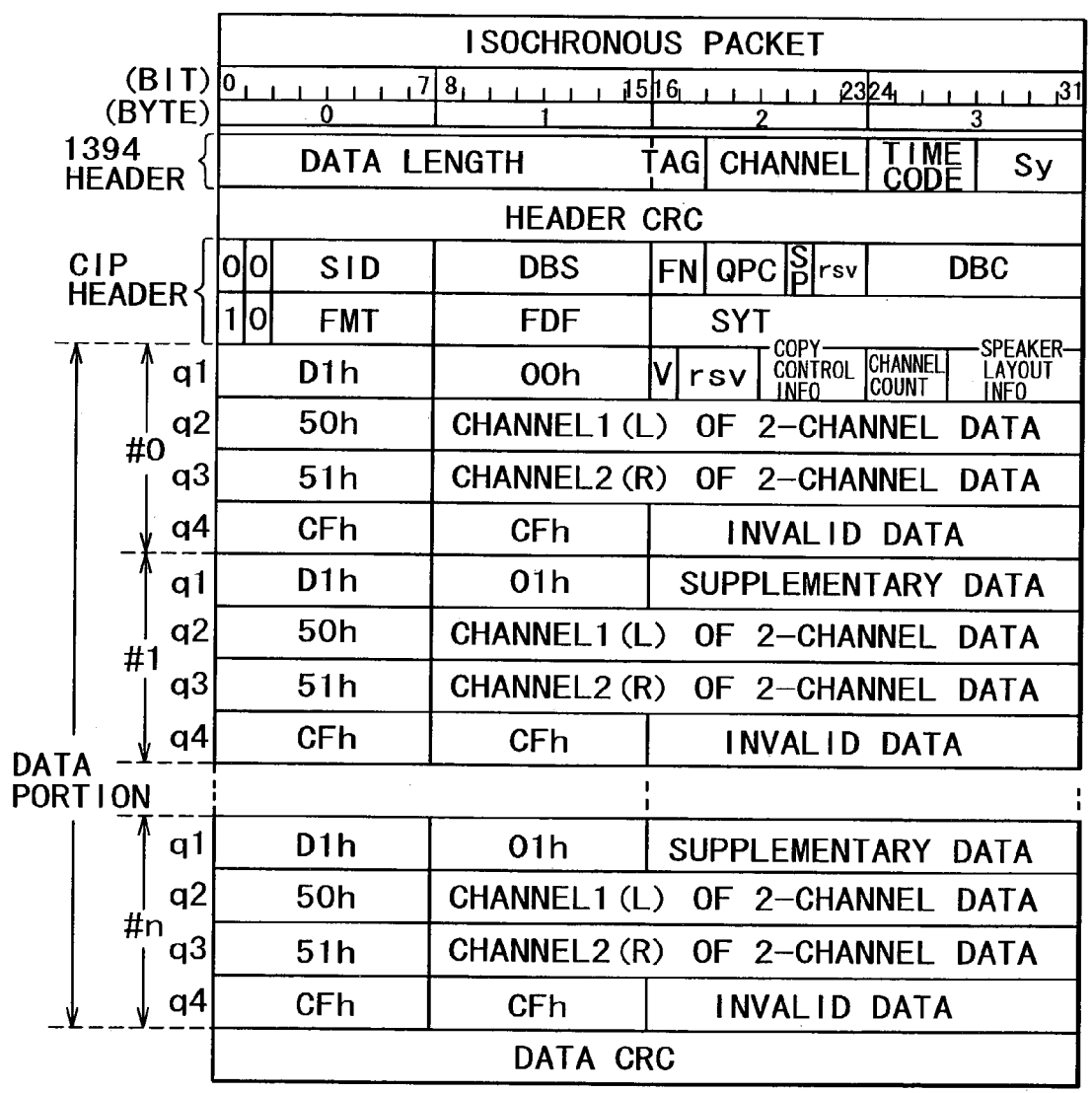
FIG. 2 is an explanatory diagram showing an isochronous packet conforming to IEEE-1394 specifications.

A preferred embodiment of the present invention is described as follows. It is to be noted that this embodiment implements a typical data transmission apparatus and a typical data reception apparatus, which are used for respectively transmitting audio data in the IEEE-1394 transmission format and receiving the data. The description of the embodiment is divided into the following paragraphs:
1. IEEE-1394 Transmission Format
2. Transmission Technique of the Embodiment
3. Transmission Apparatus and Reception Apparatus 1. IEEE-1394 Transmission Format First of all, a transmission format conforming to IEEE-1394 specifications is explained.

In data transmission adopting an IEEE-1394 technique, transmission of data is carried out by time division and into predetermined communication cycles each having a typical length of 125 microseconds and multiplexing of packets in each of the communication cycles like one shown in FIG. 1A. The transmission of signals is started by an apparatus, which outputs a CSP (Cycle Start Packet) at the beginning of each communication cycle to an IEEE-1394 bus. Referred to as a cycle master, the apparatus outputting CSPs is any one of apparatus connected to the IEEE-1394 bus. It is to be noted that, if the apparatus are all connected to a cable serving as the IEEE-1394 bus, the cycle master is automatically selected among the apparatus in accordance with a procedure prescribed by IEEE-1394 specifications.

A communication in a communication cycle includes an isochronous transmission (Iso) and an asynchronous transmission (Asy). The isochronous transmission is used for transmitting data that must satisfy a real-time requirement. Examples of data that must satisfy a real-time requirement are video and audio data. On the other hand, the asynchronous transmission is used for transmitting data such as a control command and auxiliary information with a high degree of reliability.

In each communication cycle, an isochronous packet Iso for an isochronous transmission is transmitted before an asynchronous packet Asy for an asynchronous transmission. After the transmission of an isochronous packet Iso is ended, an asynchronous packet is transmitted before the CSP of the next communication cycle. Thus, the length of a period of time available for a transmission of an asynchronous packet Asy varies in dependence on the number of transmission channels used in the transmission of an isochronous packet Iso at that time. In this transmission technique, even though the band (or the number of channels) reserved for each communication cycle is assured, the reception side does not verify the band.

If data is transmitted by using an asynchronous packet Asy, the reception side is requested to return an acknowledgment (Ack) signal so that data can be transmitted with certainty while the state of transmission is being verified.

FIG. 1B is a diagram showing the structure of a CIP (Common Isochronous Packet). That is to say, the figure shows the data structure of an isochronous packet Iso shown in FIG. 1A.

In transmission of 1-bit digital audio data in accordance with the IEEE-1394 communication as will be described later, for example, data is transmitted and received by the isochronous communication. That is to say, data of an amount required for satisfying a real-time requirement is accommodated in 1 isochronous packet and then such isochronous packets are transmitted in a sequence of communication cycles each including an isochronous packet.

As shown in FIG. 1B, an isochronous packet includes a 1394 packet header, a header CRC, a CIP header, a data portion and a data CRC.

FIG. 2 is a diagram showing a typical structure of a CIP used in a transmission of 2-channel 1-bit digital audio data in accordance with, for example, the SACD (Super Audio CD) technique.

It is to be noted that 1-bit digital audio data is audio data developed as data having a quality higher than audio data of an ordinary CD (Compact Disc). To put it in more detail, the 1-bit digital audio data is 1-bit data having a format completing $\Delta\Sigma$ modulation at, for example, an extremely high sampling frequency of 2.8224 MHz, which is 16 times the frequency of 44.1 KHz for the CD technique, having a frequency band implemented as a broad band ranging from the DC component to a frequency of 100 KHz and capable of realizing a dynamic range of 120 dB over the entire audio band.

It is to be noted that, even though this embodiment implements a method of transmitting 1-bit digital audio data as packets, the transmitted data's format and type themselves can be any format and any type respectively.

FIG. 2 shows 32 bits (4 bytes) arranged in the horizontal direction. This data on a line, that is, the data with a length of 32 bits, is called a quadlet.

The first 32 bits (the first quadlet) of a CIP is a 1394 packet header. The transmission unit 1394 packet header includes a data length (data_Length) of 16 bits, a tag of 2 bits, a channel of 6 bits, a time code (t code) of 4 bits and a sync (sy) of 4 bits.

The data length (data_Length) specifies the length of all data included in this isochronous packet. The 6-bit channel specifies the transmission channel and is not the audio data's channel such as the L or R channel.

The transmission unit 1394 packet header is followed by the header CRC occupying an area with a size of 1 quadlet.

The header CRC is followed by the CIP header occupying an area with a size of 2 quadlets. The first 2 bytes of the first quadlet in the CIP header are set at '0' and '0' respectively. The 6-bit area following the first 2 bytes is used for storing an SID (Send node ID). The 8-bit area following the SID is used for storing a DBS (Data Block Size) showing the size of a block, which is the amount of data contained in a packetizing unit. The size of a data block is expressed in terms of quadlets. Typically, a data block consists of several quadlets. The data portion following the CIP header includes (n+1) data blocks.

The DBS area is followed by an FN area having a length of 2 bits and the FN area is followed by a QPC area with a size of 3 bits. The FN area is used for storing the number of divisions in paketization. The QPC area is used for storing the number of quadlets added for carrying out division.

The QPC area is followed by a 1-bit SP area used as a flag of the header of the source packet. The rsv area is followed by a DBC area used for storing a counter's count value indicating the number of packet loss.

The first 2 bytes of the first quadlet in the CIP header are set at '1' and '0' respectively. These 2 bytes are followed by a 6-bit FMT area, which is followed by an FDF area with a length of 8 bits. The FDF area is followed by an SYT area having a length of 16 bits.

The FMT area specifies a signal format or a transmission format. A value stored in the FMT area is used for identifying the type or the format of data accommodated in this CIP. To put it concretely, the value stored in the FMT area is used for determining whether the data accommodated in this CIP is MPEG stream data, audio stream data or digital video (DV) camera stream data.

The FDF area is a format-dependent field used for further classifying the data format specified in the FMT area more finely. In the case of audio stream data, for example, a value stored in the FDF area indicates whether the audio stream data is linear audio data or MIDI data.

In the case of 1-bit digital audio data, for example, a value stored in the FMT area specifies audio stream data and a value stored in the FDF area indicates that the audio stream data is 1-bit digital audio data.

The SYT area shows a time stamp for frame synchronization.

The CIP header is followed by a data-block area (a data portion) consisting of (n+1) data blocks, namely, data blocks #0 to #n, of the transmitted data having a format indicated by the FMT and FDF areas. If the FMT and FDF areas indicate that the transmitted data is 1-bit digital audio data, for example, this data-block area is used for storing the 1-bit digital audio data.

Finally, the data-block area is followed by a data CRC.

FIG. 2 shows an example in which 1-bit digital audio data of 2 channels is stored in the data portion of a CIP transmitted in accordance with the SACD technique. This example is based on a transmission protocol referred to as AM824 applicable to data transmission through an IEEE-1394 bus. To be more specific, this figure shows a typical packet structure in a transmission of audio data of 2 channels, namely, the L and R channels, as 1-bit digital audio data.

With a quadlet consisting of 32 bits (4 bytes) as described above, in the case of 2-channel audio data transmitted as 1-bit digital audio data, 4 consecutive quadlets q1 to q4 constitute 1 data block and data blocks are arranged contiguously.

It is to be noted that, therefore, the DBS (Data Block Size) area specifies 4 quadlets.

The first byte of each quadlet (byte 0) is used as a label, which is information for identifying data stored in the quadlet. The values of labels and their descriptions are shown in FIG. 3.

As shown in the figure, the meaning of each value of the label is described. For example, a label value in the range 40h to 4Fh indicates multi-bit linear digital audio data used in a DVD (Digital Versatile Disc) system. It is to be noted that the character h appended to the number of the value as a suffix indicates that the number is expressed in the hexadecimal format.

In addition, a label value in the range 50h to 57h indicates 1-bit digital audio data whereas a label value in the range 58h to 5Fh indicates encoded 1-bit digital audio data. Furthermore, a label value in the range 80h to 83h indicates IDI data.

Moreover, a label value in the range C0h to EFh indicates ancillary data. As such, the meaning of a label value is defined to indicate that a label value functions as identification information.

Since explanation of detailed definitions of the label values is not directly related to the present invention, such definitions are not explained in detail. Nevertheless, only label values shown in FIG. 2 are described as follows:

The label at the first byte (byte 0) of the first quadlet q1 pertaining to the data block #0 shown in FIG. 2 is 'D1h' indicating that the first quadlet q1 is used for storing ancillary data. In this first quadlet q1, the second byte (byte 1) is set at '00h'.

Bytes 2 and 3 are the actual ancillary data, which includes a validity flag V, copy control information (a track attribute), a channel-count (Ch Bit Num) and speaker-location information (Loudspeaker Config).

The label value of the second quadlet q2 is '50h'. As described above, a label value in the range 50h to 57h indicates 1-bit digital audio data and, in particular, the label value of '50h' indicates the first data of a block for storing multi-channel data.

The label value of the third quadlet q3 is '51h'. The label value of '51h' indicates the second data and subsequent data of a block for storing multi-channel data.

Thus, the second and third quadlets q2 and q3 are 1-bit digital audio data of 2 channels, namely, channels 1 and 2. Data of each channel is described in 3 bytes, namely bytes 1 to 3.

The label value of the fourth quadlet q4 is 'CFh' indicating ancillary data. In particular, the label value of 'CFh' indicates invalid data (NO DATA) In addition, byte 1 serving as a sub-label also contains a value indicating invalid data. In this example, the sub-label is also set at 'CFh'. Bytes 2 and 3 are filled up with invalid data.

It is to be noted that a quadlet containing invalid data is provided in the data block in order to meet a requirement that a block shall include an even number of quadlets. In the case of this example, the number of quadlets containing valid data in the data block is 3 so that a quadlet containing invalid data needs to be added. Thus, if the number of quadlets containing valid data in the data block is even, a quadlet containing invalid data does not need to be added.

The label at the first byte (byte 0) of the first quadlet q1 pertaining to the data block #1 is 'D1h' indicating that the first quadlet q1 is used for storing ancillary data. In this first quadlet q1, the second byte (byte 1) is set at '01h'.

For a second byte of '01h', the actual ancillary data contained in bytes 2 and 3 is supplementary data.

The second to fourth quadlets are the same as those of data block #0.

Data blocks with configurations described above constitute the data portion of the isochronous packet Iso.

2. Transmission Technique of the Embodiment

The following description explains a typical case in which data is transmitted in an IEEE-1394 transmission format described above. To be more specific, the following description explains a typical case in which 1-bit digital audio data of 5 channels is transmitted in a block format conforming to the structure of a CIP in accordance with typically the SACD (Super Audio CD) technique.

That is to say, this embodiment is capable of transmitting audio data of 5 or fewer channels, that is, audio data of 1 to 5 channels, in a block format defined for 5 channels.

First of all, the concept of a block sequence is explained by referring to FIGS. 5A to 5C.

For example, a relation between audio data stored in data blocks #0, #1 and so on composing the data portion shown in FIG. 2 described above and 1-bit original digital audio data in a part of a track used as a musical unit is shown in FIGS. 5A to 5C.

FIG. 5A is a diagram showing tracks #N and #(N+1), which are each a group of data composing a piece of musical data. An example of a track is a program of typically a piece of music recorded on a disc conforming to SACD specifications. As shown in FIG. 5B, each track includes a plurality of frames.

In the case of the commonly known CD technique, a frame is an audio-data unit of a 75-Hz period, that is, an audio-data unit having a length of 13.3 msec.

As shown in FIG. 5C, a frame consists of 1,568 blocks, namely, blocks #0 to #1567.

It is to be noted that blocks #0 to 1,567 (shown in FIG. 5C) of a frame (shown in FIG. 5B) of a track shown in FIG. 5A correspond to the data portion of an isochronous packet Iso explained earlier by referring to FIGS. 1A and 1B as well as FIG. 2.

Figure 4:
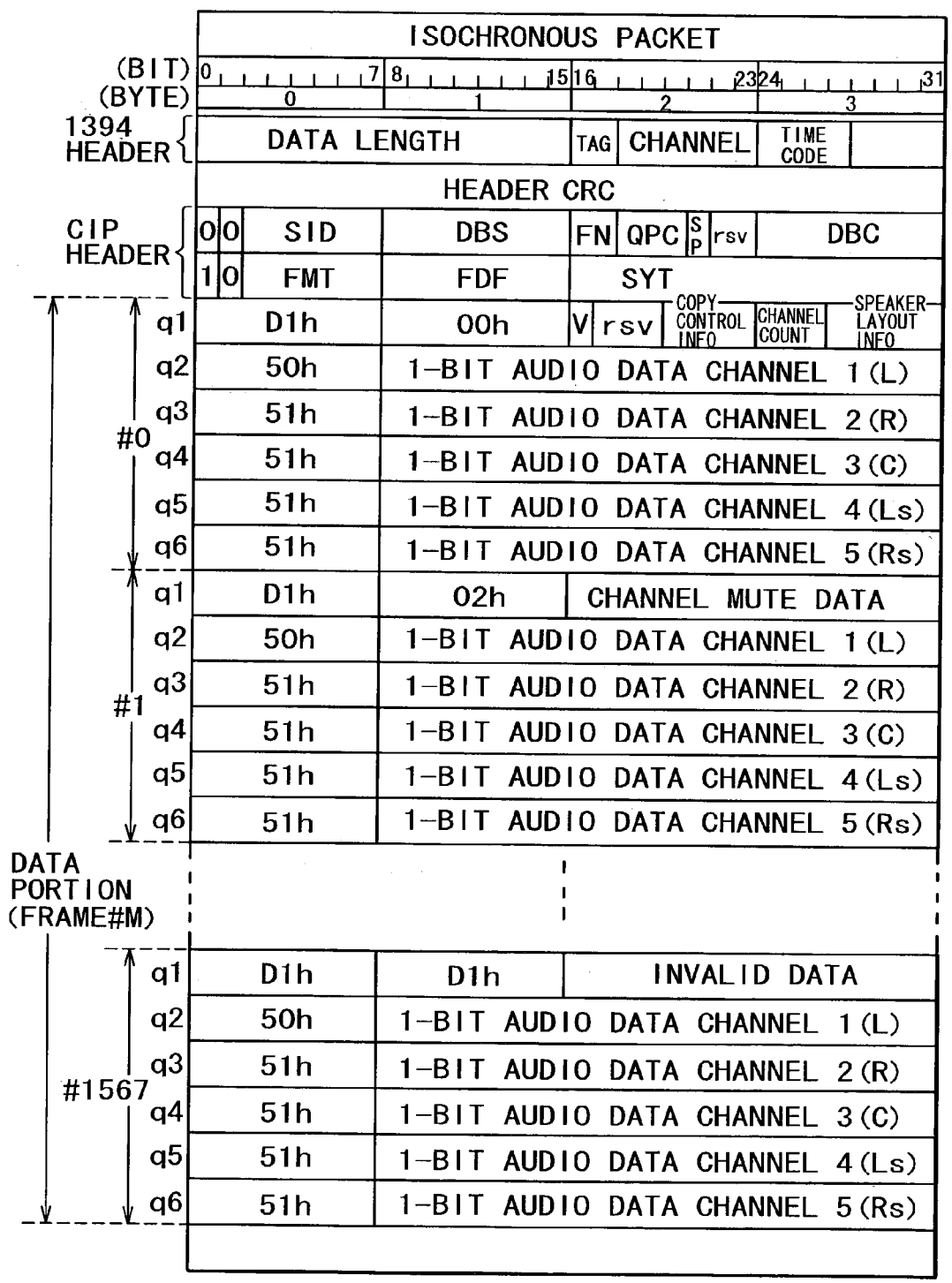
FIG. 4 is an explanatory diagram showing an IEEE-1394 isochronous packet used in an embodiment of the present invention.

FIG. 4 is a diagram showing a block format used in a transmission of 1-bit digital audio data of 5 channels in this embodiment.

The explanation of the configurations of the transmission unit 1394 header, the header CRC, the CIP header, the CIP header and the data CRC, which compose an isochronous packet having a configuration described earlier by referring to FIGS. 1A and 1B, with reference to FIG. 2 can be applied to the block format shown in FIG. 4. Thus, the explanation is not repeated.

Blocks #0 to #1567 constituting the data portion form the format for transmission of 5-channel audio data. To put it in detail, 6 quadlets q1 to q6 form a data block and such data blocks are arranged consecutively. Thus, the number recorded in he DBS (Data Block Size) is 6 indicating that a data block includes 6 quadlets.

Much like the example shown in FIG. 2, the label at the first byte (byte 0) of the first quadlet q1 pertaining to the data block #0 shown in FIG. 4 is 'D1h' indicating that the first quadlet q1 is used for storing ancillary data. In this first quadlet q1, the second byte (byte 1) used as a sub-label is set at '00h'. Bytes 2 and 3 are the actual ancillary data.

The label at the first byte (byte 0) of the second quadlet q2 is set at '50h' whereas the label at the first byte (byte 0) of the third to sixth quadlets q3 to q6 are each set at '51h'.

The second to sixth quadlets q2 to q6 are each is used for storing data as 1-bit digital audio data of the first to fifth channels (channels 1 to 5) respectively.

In this case, channel 1 is the L channel, channel 2 is the R channel, channel 3 is the C (center) channel, channel 4 is the Ls (rear left) channel and channel 5 is the Rs (rear right) channel.

Also in the case of subsequent data blocks #1 to #1567, the second to sixth quadlets q2 to q6 are each used for storing data as 1-bit digital audio data of the first to fifth channels (channels 1 to 5) respectively.

However, the first quadlet q1 of data blocks #1 to #1567 is used for storing auxiliary data (ancillary data), supplementary data, an ISRC or invalid data (NO DATA). In the case of this embodiment, nevertheless, channel mute data, which is a kind of auxiliary data, is stored in the first quadlet q1 of at least one of the data blocks.

As shown in FIG. 4, the label at byte 0 and the sub-label at byte 1 in the first quadlet q1 of block #1 are set at 'D1h' and '02h' respectively whereas bytes 2 and 3 are filled up with channel mute data.

Figure 6:
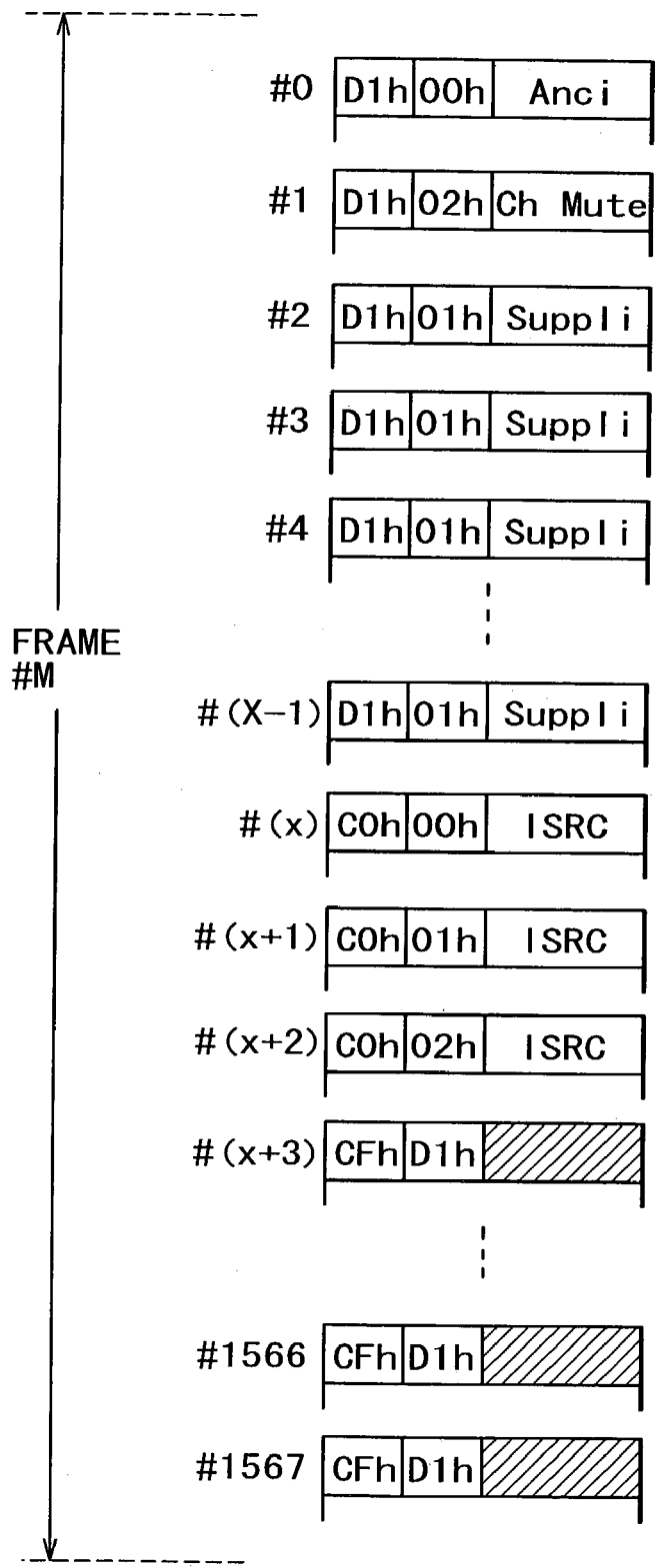
FIG. 6 is an explanatory diagram showing typical insertion of channel mute data in the embodiment.

FIG. 6 is a diagram showing only the first quadlets q1 of a sequence of blocks #0 to #1567.

In this example, the first quadlet q1 of block #0 is ancillary data, the first quadlet q1 of block #1 is channel mute data, the first quadlets q1 of blocks #2 to #(x−1) are each supplementary data and the first quadlets q1 of blocks #x to #(x+2) are each an ISRC. It is to be noted that the first quadlets q1 of blocks #(x+3) to #1567 are each invalid data (NO DATA).

As is the case with the above example, at least 1 piece of channel mute data is inserted into the data stream including isochronous packets. It is to be noted that the position into which channel mute data is inserted is not limited to data block #1. That is to say, channel mute data can be inserted into another data block, or two or more channel mute data can be inserted.

On the reception side, a data block having a label of 'D1h' and a sub-label of '02h' is recognized as a data block including channel mute data.

The channel mute data serves as determination information is used on the reception side to identify a quadlet (a channel) not allocated to valid data or 1-bit digital audio data in one block capable of accommodating 5 channels as is the case with this example.

Assume for example that channel mute data is stored in bytes 2 and 3 following a label and a sub-label stored respectively of the first quadlet q1 of data block #1. The format of bytes 2 and 3 is shown in FIG. 7A.

As shown in the figure, 16 bits of the channel mute data are allocated to channels 1 to 16 respectively. A bit value of '0' indicates that the channel associated with this bit is available. On the other hand, a bit value of '1' indicates that the channel associated with this bit is a channel that should be muted. In this way, the channel mute data shows the status of each channel in every data block.

As an example, consider a case in which each block is capable of accommodating 5 channels, namely, channels 1 to 5, as shown in FIG. 4. In this case, 5 bits of the channel mute data are used.

In a transmission of 5-channel audio data as an isochronous packet having a block structure for 5 channels shown in FIG. 4, the channel mute data's 5 bits corresponding to channels 1 to 5 are all set at 0 as shown in FIG. 7B.

In this case, the 5 bits represent the status of 1-bit digital audio data for respectively channel 1 or the L channel, channel 2 or the R channel, channel 3 or the C (center) channel, channel 4 or the Ls (rear left) channel and channel 5 or the Rs (rear right) channel, which are apportioned to the second to sixth quadlets q2 to q6 respectively.

On the other hand, FIG. 7C is a diagram showing a transmission of 3-channel audio data including no Ls (rear left) and Rs (rear right) channels as isochronous packets each having a block structure for 5 channels. In this case, in each data block, the second to fourth quadlets q2 to q4 are allocated to 1-bit digital audio data of channel 1 or the L (left) channel, channel 2 or the R (right) channel and channel 3 or the C (center) channel respectively while the fifth quadlet q5 and sixth quadlet q6 are allocated to non-existent data as each indicated by a hatched box shown on the right side of FIG. 7C.

The bits of the channel mute data assigned to channels 4 and 5 are each set at '1' as shown in the figure.

FIG. 7D is a diagram showing a transmission of 4-channel audio data including no C (center) channel as isochronous packets each having a block structure for 5 channels. In this case, in each data block, the second, third, fifth and sixth quadlets q2, q3, q5 and q6 are allocated to 1-bit digital audio data of channel 1 or the L (left) channel, channel 2 or the R (right) channel, channel 4 or the Ls (rear left) channel and channel 5 or the Rs (rear right) channel respectively while the fourth quadlet q4 is allocated to non-existent data of channel 3 or the C (center) channel as indicated by a hatched box shown on the right side of FIG. 7D.

The channel mute data's bit assigned to channel 3 is set at '1' as shown in the figure.

As is obvious from the examples shown in FIGS. 7A to 7D, isochronous packets each having a block format defined for 5 channels can be used for transmitting audio data with a channel count of 5 or smaller.

In such transmission, channel mute data can be used on the reception side to determine whether data stored in any of the quadlets q2 to q6, which are each allocated to a channel, is valid or invalid data.

Thus, it is possible to transmit, for example, monophonic audio data, 2-channel audio data of the L and R channels, 3-channel audio data of typically the L, R and C channels, 4-channel audio data of typically the L, R, Ls and Rs channels and 5-channel audio data of the L, R, C, Ls and Rs channels by using isochronous packets each having a block format defined for 5 channels.

It is to be noted that transmission using isochronous packets each having a block format defined for 5 channels has been explained above only because such a block format is one of the already prescribed block formats described by referring to FIGS. 10A to 10C. Of course, it is also possible to use the block format set for 6 channels as shown in FIG. 10C.

In this case, 6 bits of the channel mute data are assigned to channels 1 to 6 respectively and used to indicate whether a quadlet allocated to each of the channels contains valid or invalid audio data of the channel.

As is obvious from the above description, by using isochronous packets each having a block format defined for 6 channels, it is possible to transmit monophonic audio data, 2-channel audio data of the L and R channels, 3-channel audio data of typically the L, C and R or L, R and LFE channels, 4-channel audio data of typically the L, R, Ls and Rs or L, C, R and LFE channels, 5-channel audio data of typically the L, R, C, Ls and Rs or L, R, LFE, Ls and Rs channels and 6-channel audio data.

In addition, since the channel mute data has a size of 16 bits, it is possible to indicate whether a quadlet allocated to each of up to 16 channels contains valid or invalid audio data of the channel. Thus a block format defined for 16 channels can be prescribed. As a result, very various kinds of multi-channel audio data with a channel count not exceeding 16 can be transmitted in one block data format.

Furthermore, by including several pieces of channel mute data in an isochronous packet, audio data of 17 or more channels can be transmitted. For example, by allocating bytes 2 and 3 of the first quarter q1 in block #1 and bytes 2 and 3 of the first quarter q1 in block #2 to the channel mute data, channel mute data having a size of 32 bits can be provided in an isochronous packet and it is thus possible to indicate whether a quadlet allocated to each of up to 32 channels contains valid or invalid audio data of the channel.

It is to be noted that several pieces of channel mute data can be deliberately included in an isochronous packet not only for the purpose of increasing the number of treatable channels, but also for the purpose of improving the degree of reliability with which the channel mute data is fetched from an isochronous packet on the reception side if the pieces of channel mute data are copies of each other. That is to say, each piece of channel mute data is used for indicating whether a quadlet allocated to each of channels 1 to 16 contains valid or invalid audio data of the channel.

Figure 8A:
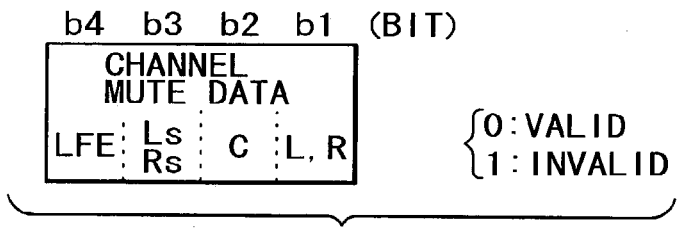
FIGS. 8A to 8D are explanatory diagrams showing channel mute data in the embodiment.

By the way, there are other typical assignments of bits composing the channel mute data. FIG. 8A is a diagram showing a typical assignment of 4 bits composing the channel mute data.

Except for a special application, normally, in transmission of audio data with a channel count of at least 2, there is no case in which only either the L channel or the R channel is used. By the same token, it is hard to assume that only either the Ls channel or the Rs channel is used. Thus, taking the advantage of these facts, bits of the channel mute data can be allocated as follows. Let bits b1, b2, b3 and b4 be the 4 bits composing the channel mute data. Bit b1 of the channel mute data is allocated to both the R and L channels, bit b2 is allocated to the C channel, bit b3 is allocated to both the Ls and Rs channels and bit 4 is allocated to the LFE channel as shown in FIG. 8A.

As described before, a bit reset to '0' indicates that the channel associated with the bit is available for transmitting valid data audio data whereas a bit set at '1' indicates that the channel associated with the bit is to be muted.

Figure 8B:
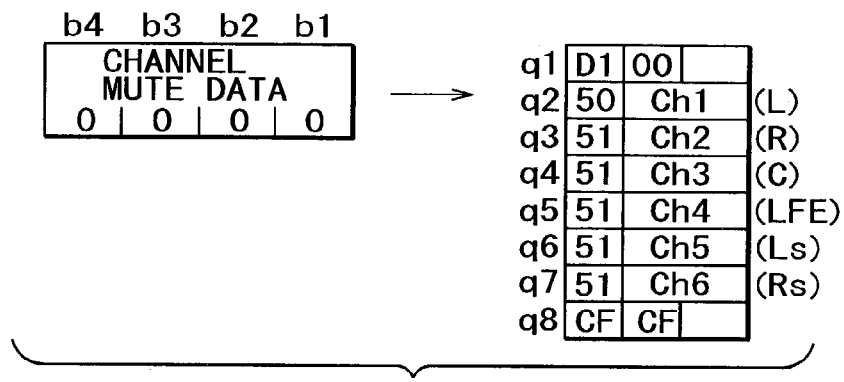

For example, assume that an isochronous packet with a format defined for 6 channels is used. In this case, if audio data of 6 channels is transmitted, all bits b1 to b4 of the channel mute data are reset to '0' as shown in FIG. 8B.

In this case, the second to seventh quadlets q2 to q7 are allocated to channel 1 (L), channel 2 (R), channel 3 (C), channel 4 (LFE), channel 5 (Ls) and channel 6 (Rs) respectively, through which 1-bit digital audio data is transmitted.

Figure 8C:
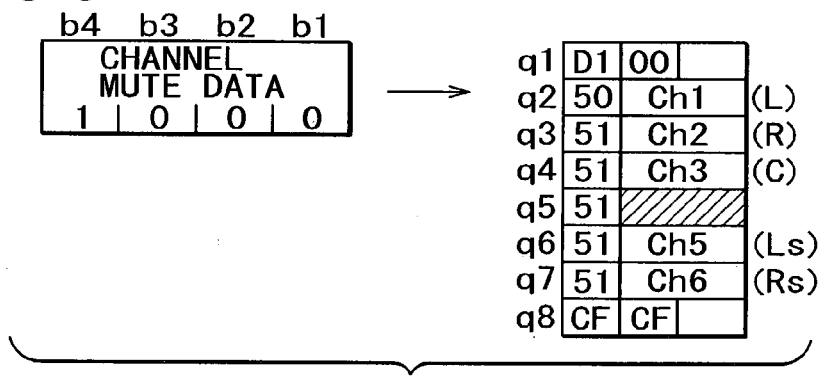

On the other hand, FIG. 8C is a diagram showing a case in which audio of 5 channels excluding the LFE (Low Frequency Enhancement) channel is transmitted by using isochronous packets each having a block format defined for 6 channels.

As shown on the right side of FIG. 8C, the second to fourth quadlets q2 to q4 are allocated to 1-bit digital audio data of channel 1 (L), channel 2 (R) and channel 3 (C) respectively whereas the sixth and seventh quadlets q6 to q7 are allocated to 1-bit digital audio data of channel 5 (Ls) and channel 6 (Rs) respectively. Thus, since channel 4 serving as the LFE (Low Frequency Enhancement) channel is not designated as a channel for transmitting audio data, the fifth quadlet q5 is shown as a hatched box to indicate that the data stored therein is invalid data.

As for the channel mute data, b4 allocated to the LFE (Low Frequency Enhancement) channel is set at 1 as shown on the left side of FIG. 8C.

Figure 8D:
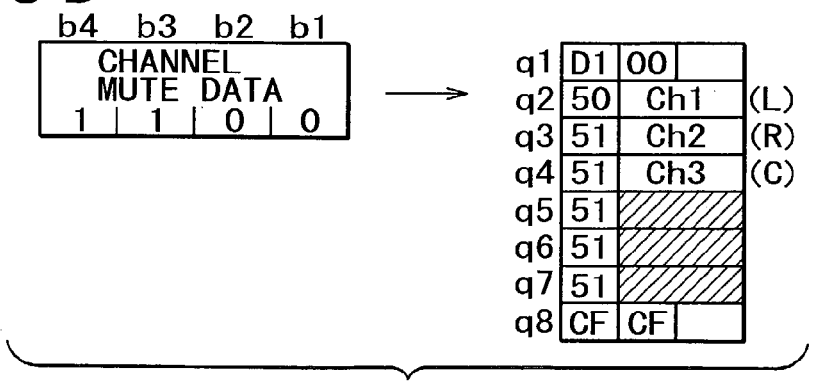

FIG. 8D is a diagram showing a case in which audio data of 3 channels L, R and C is transmitted by using isochronous packets each having a block format defined for 6 channels.

As shown on the right side of FIG. 8D, the second to fourth quadlets q2 to q4 are allocated to 1-bit digital audio data of channel 1 (L), channel 2 (R) and channel 3 (C) respectively. Since the fifth to seventh quadlets q5 to q7 each contain no valid data, however, the fifth to seventh quadlets q5 to q7 are each shown as a hatched box indicating invalid data.

As for the channel mute data, b4 allocated to the LFE (Low Frequency Enhancement) channel and b3 allocated to the Ls and Rs channels are each set at 1 as shown on the left side of FIG. 8D.

In this way, the channel mute data can be shrunk to a small size such as a bit count of 4.

Of course, there are many other conceivable formats of the channel mute data.

It is to be noted that, by inserting the channel mute data into a block as an auxiliary data as described above, the present invention can be implemented by conforming to the IEEE-1394 transmission format so that the present invention can be utilized widely as a transmission system among apparatus adopting the IEEE-1394 transmission format.

3. Transmission Apparatus and Reception Apparatus

Next, a transmission apparatus and a reception apparatus are explained.

Figure 9:
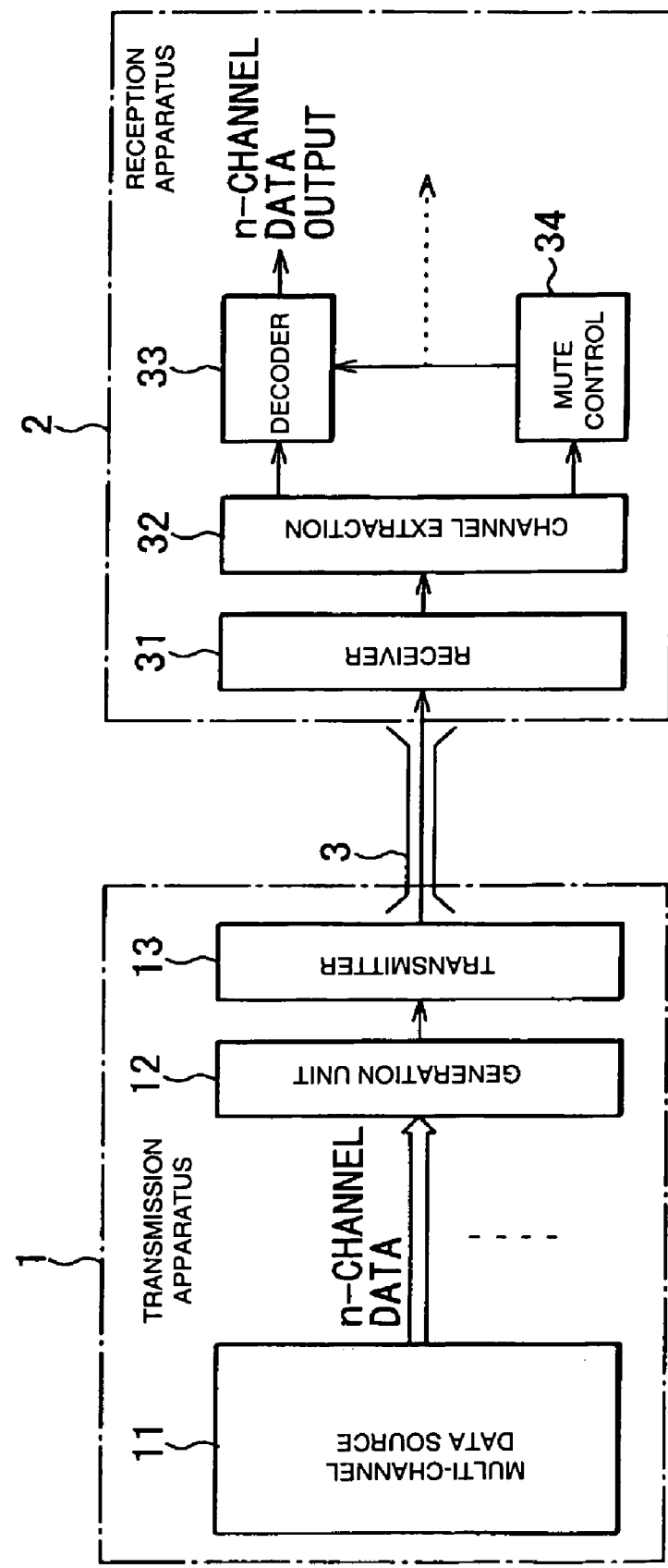
FIG. 9 is a block diagram showing a transmission apparatus and a reception apparatus, which are implemented by the embodiment.

FIG. 9 is a diagram showing an embodiment of the present invention in a model of transmission of audio data from a piece of equipment (or a circuit unit) including a transmission apparatus 1 to another piece of equipment (or another circuit unit) including a reception apparatus 2, wherein the pieces of equipment are connected to each other by a transmission line 3 conforming to the IEEE-1394 specifications.

It is to be noted that the reception apparatus 2 can be assumed to be a reproduction apparatus for reproducing received audio data or a recording apparatus for recording received audio data onto a predetermined recording medium such as a disc, a solid-state memory or a tape.

The audio data is transmitted as isochronous packets described above. An example of the audio data is 1-bit digital audio data.

The transmission apparatus 1 shown in the figure includes a multi-channel data source 11, a transmitted-data generation unit 12 and a transmission unit 13.

The multi-channel data source 11 outputs single-channel or multi-channel audio data. There are many concrete conceivable implementations of the multi-channel data source 11. The possible implementations include a reproduction unit for reproducing audio data from a recording medium such as disc media or solid-state memory media, a reception unit for receiving audio data from typically a network or a server based on a hard disk drive or the like. Without regard to the implementation of the multi-channel data source 11, the multi-channel data source 11 is capable of outputting many kinds of single-channel or multi-channel audio data. For example, n-channel audio data representing musical data is output.

The transmitted-data generation unit 12 divides the n-channel audio data received from the multi-channel data source 11 into blocks each having one of the formats described above and puts the blocks in an isochronous packet.

The transmission unit 13 outputs the isochronous packets generated by the transmitted-data generation unit 12 to an IEEE-1394 bus serving as a transmission line 3.

The reception apparatus 2 includes a reception unit 31, a channel extraction unit 32, a decode unit 33 and a mute control unit 34.

In the reception apparatus 2, the reception unit 31 receives and inputs data from the transmission line 3.

The channel extraction unit 32 decodes data of a received isochronous packet to extract audio data of each channel from every block.

The decode unit 33 decodes each audio data for a channel extracted by the channel extraction unit 32 and outputs the decoded audio data as n-channel data.

The mute control unit 34 executes mute control on specific channels for each channel's audio data extracted by the channel extraction unit 32. To be more specific, the mute control unit 34 recognizes invalid channels on the basis of channel mute data inserted into the isochronous packet and executes control to put the specified channels in a mute state during the decoding process carried out by the decode unit 33.

It is to be noted that, as an alternative, the decode unit 33 may conceivably decode received data into output 1-bit audio data of a predetermined number of channels or decode received data and further output the decoded data in the form of typically linear PCM data.

Data is transmitted from the transmission apparatus 1 to the reception apparatus 2 as follows. It is to be noted that each block in an isochronous packet has a format defined for m channels and audio data of n channels, where n≦m, is transmitted in this block format. Thus, if m=5, for example, the block format is defined for 5 channels and audio data of n channels, where n is in the range 1 to 5, is transmitted.

The multi-channel data source 11 outputs 1-bit audio data of n channels to the transmitted-data generation unit 12 as data to be transmitted. The transmitted-data generation unit 12 fetches data of each channel and forms an isochronous packet with a structure explained earlier by referring to FIG. 4. That is to say, the audio data of n channels is divided into blocks each having a format defined for 5 channels. In this case, a block's quadlets allocated to unused channels are filled up with invalid data. In addition, channel mute data is set to indicate valid or invalid channels.

Then, such an isochronous packet is transmitted from the transmission unit 13 to the reception unit 31.

In the reception apparatus 2, an isochronous packet received by the reception unit 31 is processed by the channel extraction unit 32 on the basis of the DBS (data block size) and the label value of each quadlet in every data block in order to extract audio data of m channels (5 channels).

In addition, channel mute data is recognized from label and sub-label values and supplied to the mute control unit 34.

The extracted audio data of m channels is supplied to the decode unit 33. The mute control unit 34 provides the decode unit 33 with information on which channels are to be muted or which channels contain invalid data.

The decode unit 33 decodes only data of valid channels in accordance with the information received from the mute control unit 34 in order to generate a stream of 1-bit digital audio data for n channels.

Thus, when considering the reception apparatus 2 as an audio output apparatus having a speaker system designed for m channels, for example, audio data of n channels, where n≦m, is output from the decode unit 33 as data for only speaker outputs corresponding to the n channels.

It is to be noted that, when analog audio signals are processed by typically a power amplifier serving as a circuit at a later stage as part of processing the signals and output to speakers, the mute control unit 34 supplies control information also to the later-stage circuit so as to put each of invalid channels in a mute state as a desirable feature.

As described above, audio data of n channels, where n≦m, can be transmitted in a block format defined for m channels and the reception apparatus 2 is capable of reproducing the audio data as output audio data of n channels and recording the data onto a recording medium.

Thus, for example, it is not necessary to switch the reception processing for the block format in accordance with the number of channels in the transmission. In addition, there is no case in which the reception apparatus 2 is not capable of handling audio data transmitted in an unknown block format as long as n≦m.

Furthermore, there may be a case in which a plurality of pieces of musical data needs to be transmitted consecutively with the pieces of musical data having channel counts different from each other. Even in such a case, it is not necessary to change the block format for each piece of transmitted musical data so that the transmission and reception processes can be carried out with ease.

An embodiment of the present invention has been explained so far. It is to be noted, however, that the present invention can be implemented into a variety of possible configurations and applied to various kinds of equipment.

In addition, even though the transmission system implemented by the embodiment as described above employs the transmission line 3 as a communication wire for connecting the transmission apparatus 1 to the reception apparatus 2 in conformity with the IEEE-1394 specifications, a transmission line conforming to other transmission specifications can also be used. Furthermore, it is needless to say that the present invention can also be applied to a radio communication system for carrying out communications such as satellite communications, wireless telephone communications and infrared-ray transmissions.

Furthermore, formats for transmitting data are not limited to the IEEE-1394 transmission format for the isochronous packet. That is to say, the present invention can also be applied to a variety of other transmission formats as well.

Moreover, the transmitted audio data is not limited to the 1-bit digital audio data. Of course, the present invention can also be applied to multi-bit digital audio data as well. As a matter of fact, the present invention is also applicable to transmission of video data and other kinds of transmission.

As is obvious from the above description, in accordance with the present invention, on the transmission side, data of n channels is divided into blocks each capable of accommodating data of m channels where n≦m, and a transmitted-data stream conforming to a predetermined transmission format is generated and transmitted with determination information included in the stream to be used for identifying unused channels occupied by invalid data in each block. On the reception side, on the other hand, unused channels occupied by invalid data in each block are identified on the basis of the determination information included in the received data stream transmitted in the predetermined transmission format so that only data of valid channels can be extracted from the stream.

That is to say, prior to a transmission, data of n channels is divided into blocks each defined for m channels where n≦m so that data can be transmitted without the need to define a new block format as a block format specially used for n channels. In other words, even if the channel count of the data to be transmitted changes, the data can be transmitted by using the block format, which has already been prescribed.

Thus, on the reception side, since it is necessary to merely extract data of only valid channels identified from determination information without being aware of the transmission format, the transmitted data can be received with a high degree of accuracy.

In addition, even in a transmission of consecutive contents having different channel counts musical data such as 2-channel audio data followed by 5-channel audio data or the like, it is not necessary to change the block format so that processing can be carried out with ease.

Thus, it is possible to implement transmission of data with varying channel counts with ease and a high degree of accuracy. As a result, the present invention is capable of keeping up with the transmitted data's channel counts varying even more in the future.

The invention claimed is:

1. A data transmission apparatus for transmitting digital data in a predetermined transmission format by division of said digital data into a plurality of blocks with each block including ancillary data and m data channels, comprising:

transmitted-data generation means for generating a transmitted-data stream by arranging n channels of valid data into the m channels of each of said blocks (where n and m are integers, and n<m), generating channel mute data corresponding to m-n channels of invalid data for each block, and adding the channel mute data to the ancillary data of the corresponding block; and transmission means for transmitting said transmitted-data stream generated by said transmitted-data generation means.

2. A data reception apparatus for receiving digital data in a predetermined transmission format by division of said digital data into a plurality of blocks with each block including ancillary data and m data channels, comprising:

reception means for receiving the blocks of digital data;

a channel extractor for extracting n channels of valid data from the m data channels of each block (where n and in are integers, and n<m) in accordance with the corresponding ancillary data;

a decoder for decoding the n channels of valid data extracted from each block; and a mute controller for inhibiting decoding of m-n channels of invalid data for each block in accordance with the corresponding ancillary data.

3. A data transmission method for transmitting digital data in a predetermined transmission format by division of said digital data into a plurality of blocks with each block including ancillary data and m data channels, comprising the steps of:

generating a transmitted-data stream by arranging n channels of valid data into the m channels of each of said blocks (where n and m are integers, and n<m);

generating channel mute data corresponding to m-n channels of invalid data for each block;

adding the channel mute data to the ancillary data of the corresponding block; and transmitting said transmitted-data stream.

4. A data reception method for receiving digital data in a predetermined transmission format by division of said digital data into a plurality of blocks with each block including ancillary data and m data channels, comprising the steps of:

receiving the blocks of digital data;

extracting n channels of valid data from the m data channels of each block (where n and m are integers, and n<m) in accordance with the corresponding ancillary data; decoding the n channels of valid data extracted from each block; and inhibiting decoding of m-n channels of invalid data for each block in accordance with the corresponding ancillary data.

5. A transmission system comprising a data transmission apparatus for transmitting digital data in a predetermined transmission format by division of said digital data into a plurality of blocks with each block including ancillary data and m data channels and a data reception apparatus for receiving said transmitted digital data, wherein said data transmission apparatus comprises:

transmitted-data generation means for generating a transmitted-data stream by arranging n channels of valid data into the m channels of each of said blocks (where n and m are integers, and n<m), generating channel mute data corresponding to m-n channels of invalid data for each block, and adding the channel mute data to the ancillary data of the corresponding block; and transmission means for transmitting said transmitted-data stream generated by said transmitted-data generation means, and wherein said data reception apparatus comprises:

a receiver for receiving the blocks of digital data;

a channel extractor for extracting n channels of valid data from the m data channels of each block (where n and m are integers, and n<m) in accordance with the corresponding ancillary data;

a decoder for decoding the n channels of valid data extracted from each block; and a mute controller for inhibiting decoding of m-n channels of invalid data for each block in accordance with the corresponding ancillary data.

* * * * *

UNITED STATES PATENT AND TRADEMARK OFFICE
CERTIFICATE OF CORRECTION

PATENT NO. : 7,286,602 B2  Page 1 of 1
APPLICATION NO. : 10/311774
DATED : October 23, 2007
INVENTOR(S) : Gen Ichimura It is certified that error appears in the above-identified patent and that said Letters Patent is hereby corrected as shown below:

**Column 14, line 64 claim 2, "in" should read --m--.

Signed and Sealed this

Twenty-first Day of April, 2009

JOHN DOLL
*Acting Director of the United States Patent and Trademark Office*